(12) United States Patent
Guo et al.

(10) Patent No.: US 8,606,474 B2
(45) Date of Patent: Dec. 10, 2013

(54) CONTINUOUS VARIABLE TRANSMISSION SYSTEM

(75) Inventors: Linsong Guo, Columbus, IN (US); Tim R. Frazier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 948 days.

(21) Appl. No.: 11/760,942

(22) Filed: Jun. 11, 2007

(65) Prior Publication Data
US 2008/0306664 A1   Dec. 11, 2008

(51) Int. Cl.
*G06F 19/00* (2011.01)
(52) U.S. Cl.
USPC .............. 701/54; 701/55; 701/56; 477/43
(58) Field of Classification Search
USPC ......... 701/54, 99, 123, 51, 52, 53, 55, 56, 58, 701/60, 61, 65; 477/43, 34
See application file for complete search history.

(56) References Cited

U.S. PATENT DOCUMENTS

| | | | | |
|---|---|---|---|---|
| 4,109,772 A * | 8/1978 | Poore | ............. | 477/31 |
| 4,353,272 A * | 10/1982 | Schneider et al. | ............. | 477/43 |
| 4,543,855 A * | 10/1985 | Oetting et al. | ............. | 477/43 |
| 4,598,611 A | 7/1986 | Frank | | |
| 4,627,311 A * | 12/1986 | Yokooku et al. | ............. | 477/32 |
| 4,699,025 A * | 10/1987 | Omitsu | ............. | 477/43 |
| 4,735,112 A * | 4/1988 | Osanai et al. | ............. | 477/43 |
| 4,735,114 A * | 4/1988 | Satoh et al. | ............. | 477/43 |
| 4,753,133 A * | 6/1988 | Itoh et al. | ............. | 477/43 |
| 4,836,049 A * | 6/1989 | Moan | ............. | 475/52 |
| 4,964,318 A * | 10/1990 | Ganoung | ............. | 477/110 |
| 5,046,177 A | 9/1991 | Vahabzadeh | | |
| 5,095,776 A * | 3/1992 | Sato | ............. | 477/38 |
| 5,655,992 A * | 8/1997 | Hattori | ............. | 477/107 |
| 6,056,657 A | 5/2000 | Garnett | | |
| 6,066,070 A | 5/2000 | Ito et al. | | |
| 6,167,339 A * | 12/2000 | Pels | ............. | 701/54 |
| 6,345,221 B2 | 2/2002 | Hattori et al. | | |
| 6,546,329 B2 | 4/2003 | Bellinger | | |
| 6,579,206 B2 | 6/2003 | Liu et al. | | |
| 6,866,610 B2 | 3/2005 | Ito | | |
| 6,871,129 B2 | 3/2005 | Kitaori et al. | | |
| 6,901,324 B2 | 5/2005 | Rose et al. | | |
| 7,998,006 B2 * | 8/2011 | Nihei et al. | ............. | 474/18 |
| 2004/0128048 A1 * | 7/2004 | Iwatuki et al. | ............. | 701/54 |
| 2005/0209760 A1 * | 9/2005 | Tabata et al. | ............. | 701/53 |
| 2007/0143002 A1 * | 6/2007 | Crowell et al. | ............. | 701/123 |
| 2008/0146407 A1 * | 6/2008 | Tuckfield | ............. | 477/34 |

* cited by examiner

*Primary Examiner* — Stephen Holwerda
(74) *Attorney, Agent, or Firm* — Studebaker & Brackett PC

(57) ABSTRACT

A method and system for controlling a continuously variable transmission (CVT). In one embodiment, the method includes receiving vehicle operation data. The method also includes controlling engine and transmission operations based on the vehicle operation data, fuel efficiency data, and CVT efficiency data.

18 Claims, 5 Drawing Sheets

CONTINUOUS VARIABLE TRANSMISSION SYSTEM

FIELD OF THE INVENTION

The present invention relates to transmission systems, and more particularly to continuously variable transmission systems.

BACKGROUND OF THE INVENTION

Engine fuel economy is an important design aspect of engines systems. In order to achieve better fuel efficiency, electronic control systems may provide a means for controlling engine fueling as well as engine performance. Conventional electronic control systems are able to utilize engine fuel maps to determine optimal engine speeds for efficient fuel consumption. For example, an engine fuel map may provide optimal engine speeds at which a given engine may operate in order to achieve optimal fuel efficiency. Some engine fuel maps provide a constant or fixed engine speed at which an engine may operate in order to achieve such optimal fuel efficiency. Other vehicle operation conditions such as vehicle speed and required engine power may also affect the fuel efficiency of a given engine. What is needed is an improved system and method for increasing fuel efficiency. The present invention addresses such a need.

SUMMARY OF THE INVENTION

A method and system for controlling a continuously variable transmission (CVT) is disclosed. In one embodiment, the method includes receiving vehicle operation data. The method also includes controlling engine and transmission operations based on the vehicle operation data, fuel efficiency data, and CVT efficiency data. According to the system and method disclosed herein, operations of a CVT system are improved for optimal fuel efficiency, CVT efficiency, and emissions compliance.

DETAILED DESCRIPTION OF THE INVENTION

The present invention relates to transmission systems, and more particularly to a continuously variable transmission system. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for controlling a CVT based on engine fuel efficiency and CVT efficiency. The method includes receiving vehicle operation data such as vehicle speed and required engine power. The method also includes controlling engine and transmission operations based on the vehicle operation data, fuel efficiency data, and CVT efficiency data. The fuel efficiency data is based on a relationship between engine speed and engine torque that achieves optimal fuel efficiency, and the CVT efficiency data is based on a relationship between engine speed and engine torque that achieves optimal CVT ratios (e.g., overall CVT ratio, front box ratio, and gear number). In one embodiment, the fuel efficiency data and the CVT efficiency data may be modified in order to comply with emission regulations. As a result, operations of a CVT system are improved for optimal fuel economy, optimal CVT operations, and emissions compliance. To more particularly describe the features of the present invention, refer now to the following description in conjunction with the accompanying figures.

Figure 1A:
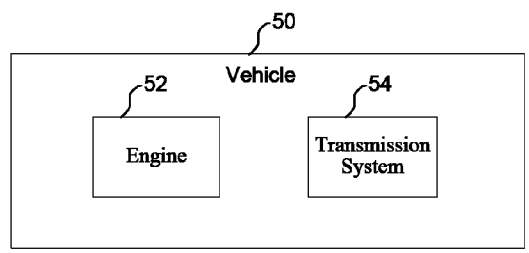
FIG. 1A is a block diagram of a vehicle in accordance with one embodiment.

FIG. 1A is a block diagram of a vehicle 50 in accordance with one embodiment. As FIG. 1A shows, the vehicle 50 includes an engine 52 and a transmission system 54. In particular embodiments, the transmission system 54 may be a CVT transmission system.

Figure 1B:
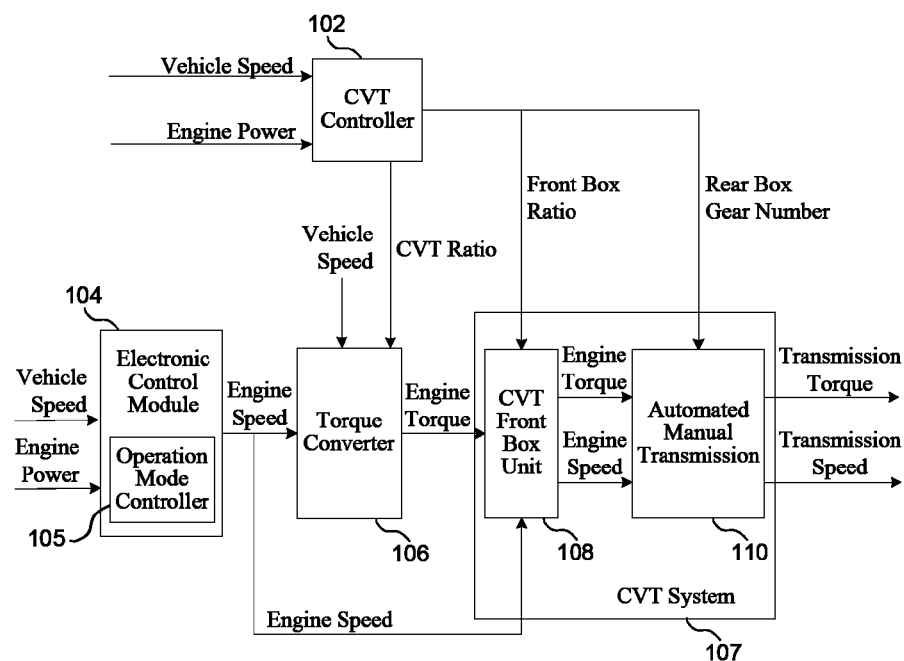
FIG. 1B is a block diagram of a CVT control system in accordance with one embodiment.

FIG. 1B is a block diagram of a CVT control system 100 in accordance with one embodiment. As FIG. 1 shows, the CVT control system 100 includes a CVT controller 102, an electronic control module (ECM) 104 having an operation mode controller 105, a torque converter 106, and a CVT system 107 that includes a CVT front box unit 108 and an automated manual transmission (AMT) 110.

In operation, the user (e.g., driver) controls the vehicle speed by controlling the engine throttle. In one embodiment, the vehicle speed and engine throttle are considered vehicle operation conditions. Other vehicle operating conditions may include, for example, wheel sizes, axle ratios, transmission ratios, etc. In one embodiment, the vehicle operation conditions may be detected by any suitable detectors. The engine throttle determines the engine torque as well as the amount of fuel consumed. In one embodiment, the electronic control module 104 may compute the engine power, which is a function of the engine torque and engine speed.

As described in more detail below, the CVT system receives vehicle operation information (e.g., vehicle speed, required engine power, etc.) and controls the transmission operations based on the vehicle operation data, fuel efficiency data, and CVT efficiency data. As described in more detail below in connection with FIG. 2, the fuel efficiency data and CVT efficiency data may be described or displayed in a CVT global optimization map. In one embodiment, the transmission operations are controlled such that they operate in either an optimal-operation mode according to an optimal-operation curve, or a fixed-speed mode according to a fixed speed.

Figure 2:
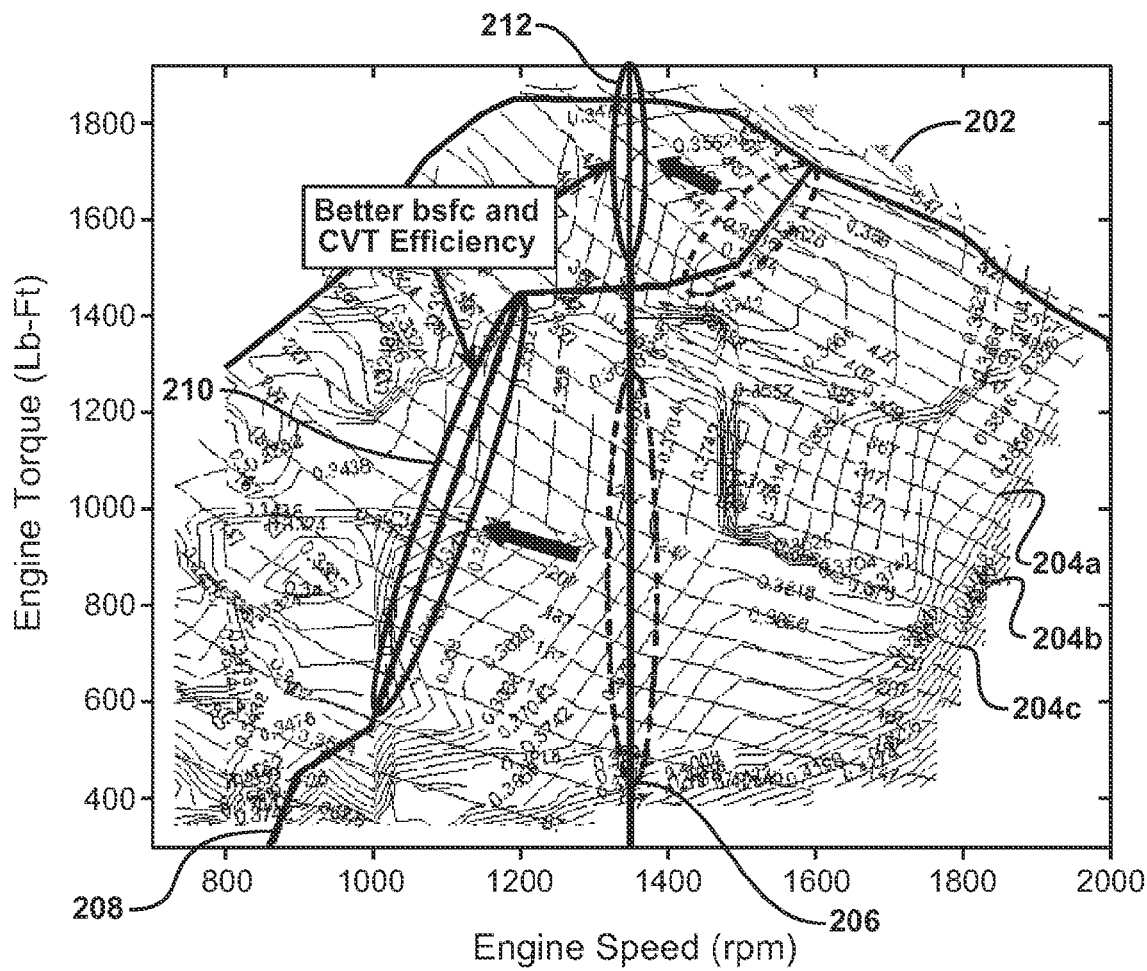
FIG. 2 is a graph showing a CVT global optimization map with an associated optimal-operation curve and an associated fixed-speed line in accordance with one embodiment.

FIG. 2 is a graph showing a CVT global optimization map with an associated optimal-operation curve and an associated fixed-speed line in accordance with one embodiment. Generally, FIG. 2 shows fuel efficiency data and CVT efficiency data that are based on a relationship between engine speed and engine torque. As described in more detail below, different intersection points on the CVT global optimization map represent engine operation points that achieve optimal fuel efficiency and optimal CVT efficiency. In one embodiment, each engine has a unique global optimization map.

The CVT global optimization map shows a fuel economy contour map that includes multiple fuel economy patterns and lines 202 that indicate the most efficient torque for a given speed. Fuel efficiency data of the fuel economy contour map is based on a relationship between engine speed and engine torque that achieves optimal fuel efficiency. For example, the fuel economy patterns and lines 202 indicate the most fuel efficient vehicle operation conditions with respect to engine speed and engine torque. In other words, the fuel economy patterns and lines 202 indicate where the least amount of fuel is consumed to achieve optimal engine break specific fuel consumption (BSFC).

The CVT global optimization map shows an equal power line contour map that overlays the fuel economy contour map. In one embodiment, the equal power line contour map that includes multiple equal power lines 204*a*, 204*b*, and 204*c* that indicate the most efficient torque for a given speed. CVT efficiency contour map may also overlay on the CVT global optimization map based on a relationship between engine speed and engine torque that achieves optimal CVT efficiency with an optimal CVT ratio. For example, the intersection points of equal power lines 204 and optimal CVT efficiency lines indicate the most CVT efficient operation conditions with respect to engine speed and engine torque. In one embodiment, the points along a given equal power line 204 represent the torque required to maintain a given power across different engine speed. For example, referring to FIG. 2, for any given equal power line 204, as the engine speed increases, less torque is required. In accordance with the equal power line contour map, the engine may run at a high-speed lower-torque or run at a low-speed higher-torque in order to achieve the same power. Therefore, the engine can provide the same power required by the vehicle operation conditions along the equal power lines with various combinations of engine speed and engine torque such that a best engine operation point along each equal power line can be chosen to achieve optimal fuel efficiency and optimal CVT efficiency.

In one embodiment, the global optimization map may be loaded in a memory in the electronic control module 104. In other embodiments, the global optimization map may be stored in another suitable memory location separate from but accessible by the electronic control module 104.

In one embodiment, the electronic control model 104 may determine different operation curves. For example, the global optimization map also shows a fixed-speed line 206 that is associated with a fixed-speed mode. The global optimization map also shows an optimal-operation curve 208 that is associated with an optimal-operation mode. For both operation curves, optimal fuel economy is achieved at points where the fuel economy patterns and lines 202 intersect the equal power lines 204.

In one embodiment, the optimal-operation curve intersects the points on the each equal power line with the lowest BSFC value. In other words, a given equal power line intersects fuel economy patterns and lines 202, where each intersection has an associated BSFC value according to the fuel economy contour map. Accordingly, on a given equal power line 204, there are multiple BSFC values. As such, the optimal-operation curve intersects each equal power line at the point where the equal power line intersects the fuel economy patterns and lines 202 with the lowest BSFC value. In operation, as the engine speed increases, the optimal-operation curve indicates the engine torque and engine speed to achieve both optimal fuel efficiency and optimal CVT efficiency.

In one embodiment, the optimal-operation curve may be adjusted to conform to emission compliance requirements. In one embodiment, the electronic control module 104 may adjust the optimal-operation curve based on predetermined emissions compliance data to meet the emissions regulations. Emission compliance requirements such as break specific nitrogen oxidation (BSNOx) and break specific particulate matter (BSPM) contour maps may also overlay on FIG. 2 such that the optimal-operation curve may be determined to conform to the emission compliance requirements.

In one embodiment, the fixed-speed line 206 indicates a fixed-speed at which the engine may run to achieve a better fuel efficiency. The fixed-speed line is normally determined to ensure that the engine operates at the best fuel economy region for most operation conditions (e.g., vehicle cruise speed operation condition). In one embodiment, a special engine calibration may be developed to run along the fixed-speed mode such that best fuel economy may be achieved over various duty cycles.

In one embodiment, in a global optimization mode, the electronic control module 104 may switch between optimal-operation mode and fixed-speed mode during certain predefined vehicle operation conditions. In particular embodiments, under some vehicle operation conditions, it may be more efficient to operate the engine along the optimal-operation mode, in terms of both a fuel efficiency and CVT efficiency. Under other vehicle operation conditions, it may be more efficient to operate the engine along the fixed-speed mode, in terms of both fuel efficiency and CVT efficiency. For example, during operation, the electronic control module 104 may control the engine speed and engine torque to follow the optimal-operation curve 208 (e.g., at portion 210) below a predefined engine speed (e.g., 1350 rpm) and follow the fixed-speed line 206 (e.g., at portion 212) at or above the predefined engine speed. Accordingly, the global optimization map combines the fuel economy contour map with the equal power line contour map to indicate the best fuel efficiency and the best CVT efficiency.

As indicated above, the optimal-operation data (engine speed versus engine torque) and the fixed-speed data may be predetermined and stored in any suitable memory location at the electronic control module 104 or separate from the electronic control module 104. The electronic control module 104 may access the data and utilize the data in order to control the overall CVT ratio.

In particular embodiments, these operation curves ensure optimized fuel efficiency and CVT efficiency during steady state operation of real drive cycles while meeting the emissions regulations. For example, for on-highway drive cycles that require the engine to run at a high-power output for a long period of time, the global optimization mode enables the electronic control module 104 to transition between the optimal-operation mode and fixed-speed mode to achieve optimal fuel and CVT efficiency depending on the engine torque.

Figure 3:
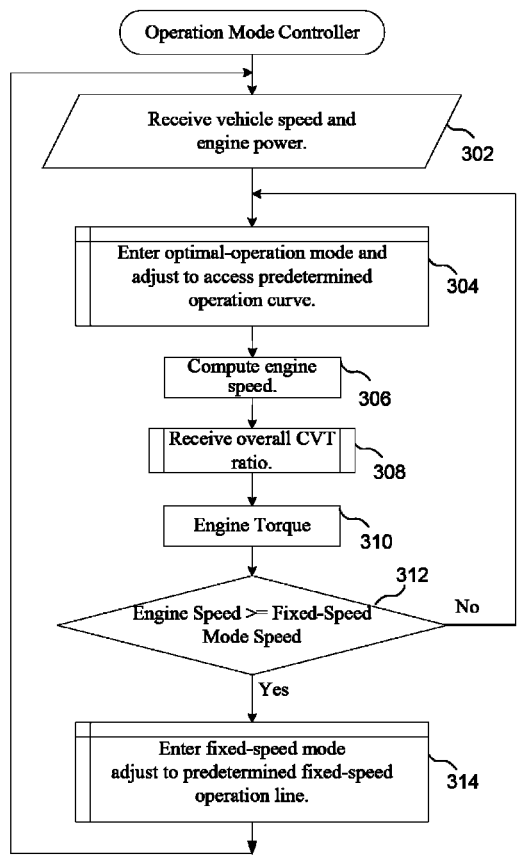
FIG. 3 is a flow chart showing a method for controlling a CVT system in accordance with one embodiment.

FIG. 3 is a flow chart showing a method for controlling a CVT system in accordance with one embodiment. Referring to both FIGS. 1 and 3, the process begins in step 302 where the operation mode controller 105 of the electronic control module 104 receives vehicle operation condition data such as a vehicle speed and a required engine power. In step 304, the operation mode controller 105 enters an optimal-operation mode. In one embodiment, the optimal operation curve is predetermined. In one embodiment, values associated with the optimal operation curve may be stored in a lookup table in the electronic control module 104, or may be located elsewhere and accessible by the electronic control module 104.

In step 306, the operation mode controller 105 then computes an engine speed based on the optimal-operation curve. In step 308, the operation mode controller 105 receives an overall CVT ratio from the CVT controller 102. In step 310, the torque converter 106 computes an engine torque based on the engine speed, the vehicle speed, and the overall CVT ratio. In step 312, the electronic control module 104 determines whether the engine speed is greater than or equal to a fixed-speed mode speed. If not, the operation mode controller 105 remains in the optimal-operation mode. In one embodiment, a speed governor may be used to adjust the speed in the optimal-operation mode. If the engine speed is greater than or equal to the fixed-speed mode speed, in step 314, the operation mode controller 105 transitions from the optimal-operation mode to a fixed-speed mode. The operation curve of FIG. 2 shows an example curve illustrating a fixed-speed mode. In one embodiment, the fixed speed is determined by the predetermined operation curve. In one embodiment, a speed governor may be used to maintain the fixed speed. In one embodiment, the operation mode controller 105 remains in the fixed-speed mode until the vehicle operating conditions change (e.g., the actual engine speed drops below the predetermined engine speed).

Figure 4:
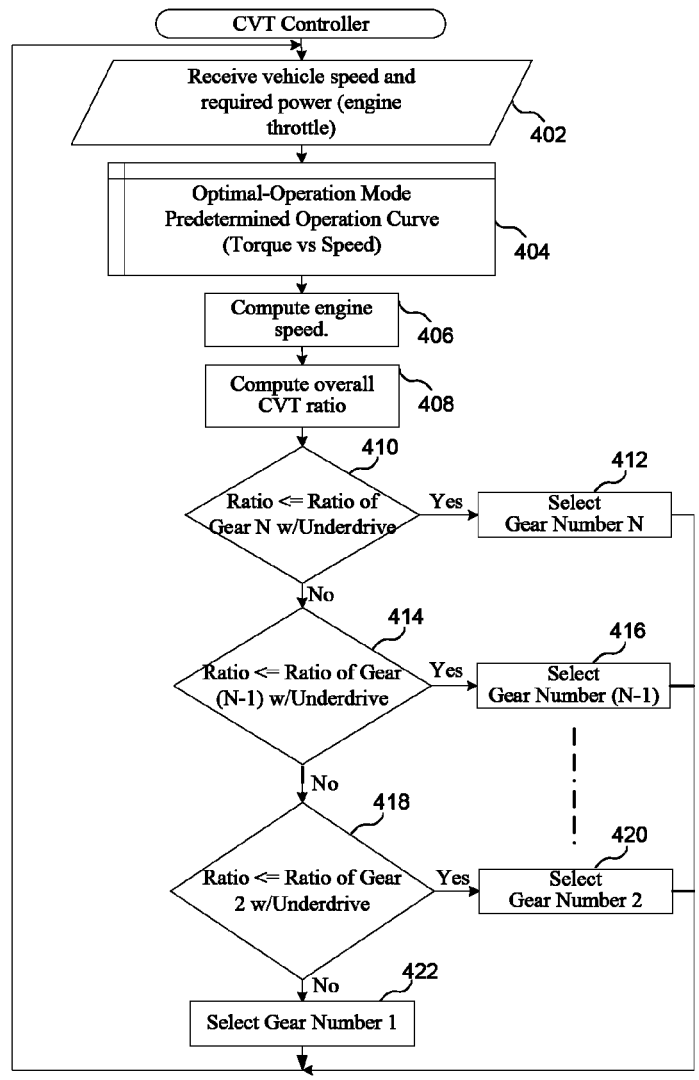
FIG. 4 is a flow chart illustrating a process for determining an optimal gear number in accordance with one embodiment.

FIG. 4 is a flow chart illustrating a process for determining an optimal gear number in accordance with one embodiment. Referring to both FIGS. 1 and 4, the process begins in step 402 when the CVT controller 102 receives vehicle operation condition information such as a vehicle speed and a required engine power. In step 404, the operation mode controller 105 enters an optimal-operation mode. In step 406, the electronic control module 104 then computes an engine speed based on the optimal operation curve. In step 408, the CVT controller 102 computes an overall CVT ratio based on the engine speed and the vehicle speed. In one embodiment, the front box has a continuously variable ratio. The ratio range may be narrow (e.g., 0.7 to 1.2). In one embodiment, the lower end of the range (e.g., 0.7) may be referred to as an overdrive condition, and the higher end of the range (e.g., 1.2) may be referred to an underdrive condition. In order to have a larger ratio, the automated manual transmission 110 provides a larger ratio, though not continuous. The total ratio is the first box ratio multiplied by the larger box ratio. This provides a larger, continuous ratio. The CVT controller 102 then sends the CVT ratio to the torque converter 106.

In step 410, the CVT controller 102 determines whether the overall CVT ratio is less than or equal to the ratio of gear N with underdrive, where gear N is the highest gear of the automated manual transmission 110. In one embodiment, underdrive refers to a higher front box ratio at the CVT front box unit 108. Typically, the higher the gear, the greater the efficiency. As such, the CVT controller 102 selects the highest gear number possible, where the overall CVT ratio is less than or equal to the ratio which this gear can provide. In one embodiment, the CVT controller 102 may select the highest possible gear number based on one or more of the overall CVT ratio, AMT gear ratio, and front box ratio. If the overall CVT ratio is less than or equal to the ratio of gear N, in step 412, the CVT controller 102 selects a gear number N. If not, in step 414, the CVT controller 102 determines whether the overall CVT ratio is less than or equal to the ratio of gear (N-1) with underdrive. If yes, in step 416, the CVT controller 102 selects gear number (N-1). If not, in step 418, the CVT controller 102 determines whether the overall CVT ratio is less than or equal to the ratio of gear 2 with underdrive. If yes, in step 420, the CVT controller 102 selects gear number 2. If not, in step 422, the CVT control system 100 selects gear number 1. As such, the CVT controller 102 provides the optimal gear number and CVT front box ratio for the best CVT efficiency.

According to the system and method disclosed herein, the present invention provides numerous benefits. For example, embodiments of the present invention increase fuel efficiency. Embodiments of the present invention also optimize CVT efficiency.

A method and system for controlling a continuously variable transmission (CVT) have been disclosed. The method includes receiving vehicle operation data. The method also includes controlling transmission operations based on the vehicle operation data, fuel efficiency data, and CVT efficiency data. In one embodiment, the optimal operation curve may be modified in order to comply with emission regulations. As a result, operations of a CVT system are improved for optimal fuel efficiency, CVT efficiency, and emissions compliance.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for controlling a continuously variable transmission (CVT), the method comprising:
    receiving vehicle operation data; and
    controlling engine and transmission operations based on the vehicle operation data, fuel efficiency data, and CVT efficiency data, wherein said receiving vehicle operation data and said controlling engine and transmission operations are performed by at least one processor, and said controlling engine and transmission operations include the processes of:
    determining an optimal engine speed based on the vehicle operation data and the fuel efficiency data;
    determining a fixed-speed mode speed based on the fuel efficiency data;
    if the optimal engine speed is equal to or greater than the fixed-speed mode speed:
        determining an overall CVT ratio that is based on the fixed-speed mode speed, a vehicle speed, and the CVT efficiency data; and
        controlling the transmission operations in a fixed-speed mode such that engine speed is maintained at the fixed-speed mode speed, engine torque is a function of vehicle operation conditions, and the determined overall CVT ratio based on the fixed-speed mode speed; and
    if the optimal engine speed is less than the fixed-speed mode speed:
        determining an overall CVT ratio that is based on the optimal engine speed, the vehicle speed, and the CVT efficiency data, and
        controlling the transmission operations in an optimal-operation mode such that engine torque is a function of a varying engine speed and the determined overall CVT ratio based on the optimal engine speed.

2. The method of claim 1 wherein the vehicle operation data comprises a vehicle speed and a required engine power.

3. The method of claim 1 wherein the fuel efficiency data is based on a relationship between engine speed and engine torque that achieves optimal fuel efficiency.

4. The method of claim 1 wherein the CVT efficiency data is based on a relationship between engine speed and engine torque that achieves an optimal CVT ratio.

5. The method of claim 1 further comprising:
selecting the highest possible gear number based on the overall CVT ratio, automated manual transmission (AMT) gear ratio, and front box ratio.

6. The method of claim 1 further comprising modifying the fuel efficiency data and the CVT efficiency data based on emissions data.

7. A non-transitory computer-readable medium containing program instructions for controlling a continuously variable transmission (CVT), the program instructions which when executed by a computer system cause the computer system to execute a method comprising:
receiving vehicle operation data;
controlling engine and transmission operations based on the vehicle operation data, fuel efficiency data, and CVT efficiency data;
determining an optimal engine speed based on the vehicle operation data and the fuel efficiency data;
determining a fixed-speed mode speed based on the fuel efficiency data;
if the optimal engine speed is equal to or greater than the fixed-speed mode speed:
determining an overall CVT ratio that is based on the fixed-speed mode speed, a vehicle speed, and the CVT efficiency data; and
controlling the transmission operations in a fixed-speed mode such that the engine speed is maintained at the fixed-speed mode speed, engine torque is a function of vehicle operation conditions, and the determined overall CVT ratio based on the fixed-speed mode speed; and
if the optimal engine speed is less than the fixed-speed mode speed:
determining an overall CVT ratio that is based on the optimal engine speed, the vehicle speed, and the CVT efficiency data, and
controlling the transmission operations in an optimal-operation mode such that engine torque is a function of a varying engine speed and the determined overall CVT ratio based on the optimal engine speed.

8. The computer-readable medium of claim 7 wherein the vehicle operation data comprise a vehicle speed and a required engine power.

9. The computer-readable medium of claim 7 wherein the fuel efficiency data is based on a relationship between engine speed and engine torque that achieves optimal fuel efficiency.

10. The computer-readable medium of claim 7 wherein the CVT efficiency data is based on a relationship between engine speed and engine torque that achieves an optimal CVT ratio.

11. The computer-readable medium of claim 7 further comprising program instructions for:
selecting the highest possible gear number based on the overall CVT ratio, automated manual transmission (AMT) gear ratio, and front box ratio.

12. The computer-readable medium of claim 7 further comprising program instructions for modifying the fuel efficiency data and the CVT efficiency data based on emissions data.

13. A continuously variable transmission (CVT) system comprising:
a CVT controller operative to receive vehicle operation data;
an electronic control module (ECM) operatively coupled to the CVT controller and operative to receive the vehicle operation data;
a CVT front box operatively coupled to the CVT controller and the ECM; and an automated manual transmission (AMT) operatively coupled to the CVT controller and the ECM, wherein the CVT controller and the ECM are operative to control transmission operations of the CVT front box and the AMT based on the vehicle operation data, fuel efficiency data, and CVT efficiency data, wherein the ECM is operable to:
determine an optimal engine speed based on the vehicle operation data and the fuel efficiency data;
determine a fixed-speed mode speed based on the fuel efficiency data;
if the optimal engine speed is equal to or greater than the fixed-speed mode speed:
determine an overall CVT ratio that is based on the fixed-speed mode speed, a vehicle speed, and the CVT efficiency data; and
control the transmission operations in a fixed-speed mode such that engine speed is maintained at the fixed-speed mode speed, engine torque is a function of vehicle operation conditions, and the determined overall CVT ratio is based on the fixed-speed mode speed; and
if the optimal engine speed is less than the fixed-speed mode speed:
determine an overall CVT ratio that is based on the optimal engine speed, the vehicle speed, and the CVT efficiency data, and
control the transmission operations in an optimal-operation mode such that engine torque is a function of a varying engine speed and the determined overall CVT ratio based on the optimal engine speed.

14. The system of claim 13 wherein the vehicle operation data comprise a vehicle speed and a required engine power.

15. The system of claim 13 wherein the fuel efficiency data is based on a relationship between engine speed and engine torque that achieves optimal fuel efficiency.

16. The system of claim 13 wherein the CVT efficiency data is based on a relationship between engine speed and engine torque that achieves an optimal CVT ratio.

17. The system of claim 13, wherein the CVT controller is operable to:
select the highest possible gear number based on the overall CVT ratio, AMT gear ratio, and front box ratio.

18. A vehicle comprising:
an engine; and
a continuously variable transmission (CVT) system coupled to the engine, the CVT system comprising:
a CVT controller operative to receive vehicle operation data;
an electronic control module (ECM) operatively coupled to the CVT controller and operative to receive the vehicle operation data;
a CVT front box operatively coupled to the CVT controller and the ECM; and
an automated manual transmission (AMT) operatively coupled to the CVT controller and the ECM, wherein the CVT controller and the ECM are operative to control transmission operations of the CVT front box and the AMT based on the vehicle operation data, fuel efficiency data, and CVT efficiency data, wherein the ECM is operable to:
determine an optimal engine speed based on the vehicle operation data and the fuel efficiency data;

determine a fixed-speed mode speed based on the fuel efficiency data;

if the optimal engine speed is equal to or greater than the fixed-speed mode speed:

determine an overall CVT ratio that is based on the fixed-speed mode speed, a vehicle speed, and the CVT efficiency data; and control the transmission operations in a fixed-speed mode such that engine speed is maintained at the fixed-speed mode speed, engine torque is a function of vehicle operation conditions, and the determined overall CVT ratio is based on the fixed-speed mode speed; and if the optimal engine speed is less than the fixed-speed mode speed:

determine an overall CVT ratio that is based on the optimal engine speed, the vehicle speed, and the CVT efficiency data, and control the transmission operations in an optimal-operation mode such that engine torque is a function of a varying engine speed and the determined overall CVT ratio based on the optimal engine speed.

\* \* \* \* \*